June 17, 1930. O. O. SKREEN 1,764,755
DEVICE FOR INTRODUCING WATER INTO ENGINE CYLINDERS
Filed Aug. 23, 1926

Inventor
O. O. Skreen.
By Whiteley and Ruckman
Attorneys.

Patented June 17, 1930

1,764,755

UNITED STATES PATENT OFFICE

ORLANDO O. SKREEN, OF MINNEAPOLIS, MINNESOTA

DEVICE FOR INTRODUCING WATER INTO ENGINE CYLINDERS

Application filed August 23, 1926. Serial No. 130,911.

My invention relates to devices for introducing water into engine cylinders, and an object is to provide a device by means of which water in regulated quantity is introduced directly into the cylinders of internal combustion engines from a tank containing a supply of water. A further object is to introduce water without carrying any air with it into the cylinders except the slight amount of air which is normally contained in water. This amount is so small as to be negligible. I am aware of the fact that it has been proposed to introduce steam or moist air taken from the top of the radiator into the intake manifold, but I believe that my invention is broadly new in regard to introducing water taken from an independent supply directly into the cylinders without the addition of any appreciable amount of air taken in with the water. It will be comprehended that it is advantageous to introduce the water in this manner since all of the air is thus supplied through the carbureter and the carbureter will still continue to function for supplying the proper amount of air regardless of the amount of water which is being introduced. Furthermore, the water is not introduced at a point where it can have any effect upon the thorough homogenizing of the explosive mixture.

The full objects and advantages of my invention will appear in connection with the detailed description thereof, and the novel features of my inventive idea will be particularly pointed out in the claim.

In the accompanying drawings which illustrate a practical embodiment of my invention,—

Figure 1:
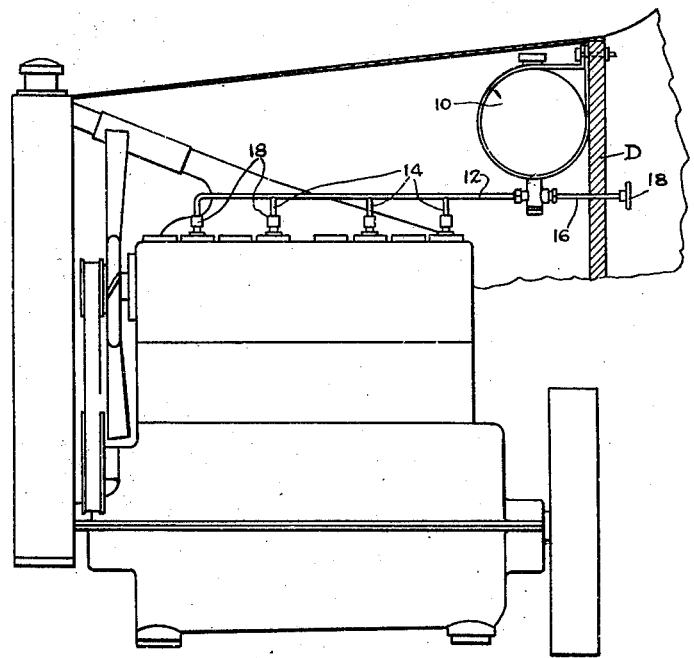
Figure 2:
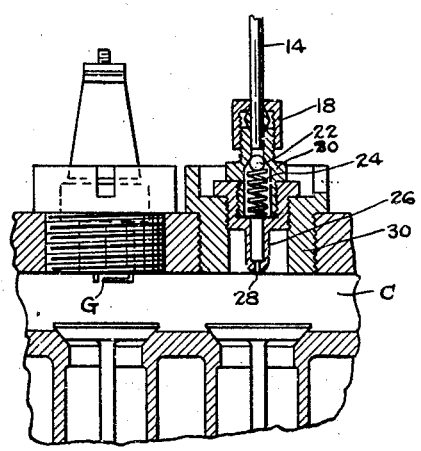
Figure 3:
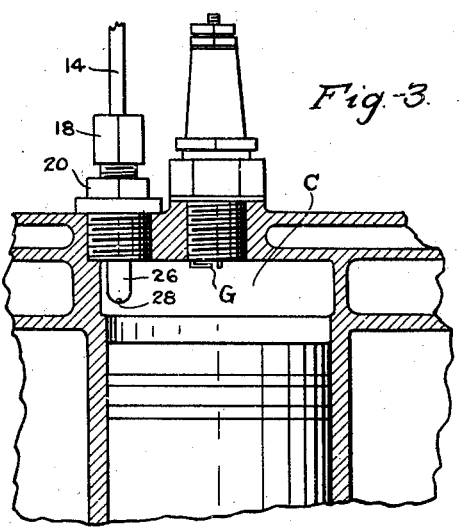

Fig. 1 is a side elevational view of a common form of internal combustion engine showing my device connected therewith. Fig. 2 is a vertical sectional view showing how my device is connected to one form of engine. Fig. 3 is a vertical sectional view showing how my device is connected to another form of engine.

Referring to the drawings for the purpose of describing my invention in detail, it will be seen that I provide a water receptacle 10 which is shown attached to the front side of the dash D of an automobile although it may be attached at any other convenient place and may operate by vacuum feed. The bottom of this receptacle is connected by a pipe 12 with branch pipes 14, there being one of these latter pipes leading into each of the combustion chambers C of the engine. The flow of water into the pipe 12 from the receptacle 10 may be controlled in any suitable manner as by a valve having a valve stem 16 to the outer end of which is secured a hand wheel 18 within easy reach of the driver. Fig. 2 shows in detail the construction which is associated with each of the branch pipes 14. As shown in this figure the branch pipe 14 extends through a packing gland 18 into a valve casing 20 which is provided with a valve seat for a downwardly opening check valve 22 normally held up in engagement with the valve seat by a coiled spring 24. The lower end of the valve casing 20 is reduced to produce a tubular member or spraying nozzle 26 in the lower end of which there is a perforation or spray opening 28. For convenience in manufacture, the valve casing 20 is made in two parts screwed together as shown and the valve casing is provided with external threads. In the form shown in Fig. 2, the valve casing is threaded into a tubular member 30 which in turn is threaded through the engine wall. In the form shown in Fig. 3, the valve casing is threaded directly through the engine wall. In both cases, the spray opening 28 is located adjacent the spark gap G of the customary spark plug.

The operation and advantages of my invention will now be obvious. When the engine is running, the suction stroke of the pistons causes water to be drawn from the bottom of the receptacle 10 through the pipe 12 which passes over the engine so that the water is heated. The hot water is drawn past the valve 22 through the spray opening 28 into the combustion chamber adjacent the spark gap where the water is completely converted into steam during the compression stroke of the pistons. The presence of the steam in the combustion chambers not only reduces the quantity of carbon which is formed but produces greater efficiency of the explosive mixture in the operation of the engine.

I claim:

A device for introducing water into engine cylinders comprising a receptacle for water, valve casings secured to the engine wall outside the respective combustion chambers of the engine, inwardly opening check valves in said valve casings, spray nozzles leading from said valve casings into the combustion chambers adjacent the spark gaps therein, and a pipe line leading directly from said water receptacle to said valve casings whereby small quantities of water only are continuously drawn from said receptacle through said spray nozzles by the suction of the engine.

In testimony whereof I hereunto affix my signature.

ORLANDO O. SKREEN.